US008209334B1

(12) United States Patent
Doerner

(10) Patent No.: US 8,209,334 B1
(45) Date of Patent: Jun. 26, 2012

(54) METHOD TO DIRECT DATA TO A SPECIFIC ONE OF SEVERAL REPOSITORIES

(76) Inventor: Don Doerner, San Jose, CA (US)

( * ) Notice: Subject to any disclaimer, the term of this patent is extended or adjusted under 35 U.S.C. 154(b) by 339 days.

(21) Appl. No.: 11/966,947

(22) Filed: Dec. 28, 2007

(51) Int. Cl.
G06F 17/30 (2006.01)
G06F 17/00 (2006.01)
(52) U.S. Cl. .......... 707/747; 707/745; 707/698
(58) Field of Classification Search .......... 707/609, 707/672–673, 687, 693, 696–700, 790–791, 707/803, 745–747; 711/209, 215, 118, 153–155; 713/176; 714/776, 52
See application file for complete search history.

(56) References Cited

U.S. PATENT DOCUMENTS

| 5,664,016 | A  | * | 9/1997  | Preneel et al. .......... 380/28 |
| 5,970,495 | A  | * | 10/1999 | Baru et al. .......... 1/1 |
| 5,990,810 | A  |   | 11/1999 | Williams |
| 6,374,266 | B1 | * | 4/2002  | Shnelvar .......... 707/204 |
| 6,549,957 | B1 | * | 4/2003  | Hanson et al. .......... 710/5 |
| 6,578,039 | B1 | * | 6/2003  | Kawamura .......... 1/1 |
| 6,704,730 | B2 |   | 3/2004  | Moulton et al. |
| 6,801,921 | B2 | * | 10/2004 | Tsuchida et al. .......... 1/1 |
| 6,928,526 | B1 | * | 8/2005  | Zhu et al. .......... 711/154 |
| 6,934,796 | B1 | * | 8/2005  | Pereira et al. .......... 711/108 |
| 7,062,648 | B2 |   | 6/2006  | Moulton et al. |
| 7,263,596 | B1 | * | 8/2007  | Wideman et al. .......... 711/209 |
| 7,389,305 | B1 | * | 6/2008  | Kindig et al. .......... 707/103 R |
| 7,797,323 | B1 | * | 9/2010  | Eshghi et al. .......... 707/737 |
| 7,870,103 | B1 | * | 1/2011  | Maheshwari et al. .......... 707/687 |
| 2003/0095724 | A1 | * | 5/2003 | Kia et al. .......... 382/313 |
| 2003/0208761 | A1 | * | 11/2003 | Wasserman et al. .......... 725/53 |
| 2004/0255140 | A1 |  | 12/2004 | Margolus et al. |
| 2005/0071390 | A1 |  | 3/2005  | Midgley et al. |
| 2005/0097361 | A1 | * | 5/2005 | Apostolopoulos et al. ... 713/201 |
| 2006/0004808 | A1 | * | 1/2006 | Hsu et al. .......... 707/101 |
| 2006/0112112 | A1 | * | 5/2006 | Margolus et al. .......... 707/100 |
| 2006/0149806 | A1 | * | 7/2006 | Scott et al. .......... 709/201 |
| 2006/0271540 | A1 |  | 11/2006 | Williams |

(Continued)

FOREIGN PATENT DOCUMENTS

WO    WO 98/47259    * 10/1998

(Continued)

OTHER PUBLICATIONS

Andrew B.J. Teoh et al. "Personalised cryptographic key generation based on FaceHashing",Computers & Security (2004) 23, 606e614.*

(Continued)

Primary Examiner — Srirama Channavajjala

(57) ABSTRACT

Data de-duplication schemes reduce the amount of storage necessary to store a data set by dividing the data into segments and storing a segment identifier on a storage medium in place of each data segment. Each unique data segment is stored in a repository, and duplicate data segments are not stored. Methods and apparatus are provided for distributing data segments across multiple repositories in a data storage system, thereby reducing the quantity of data stored at a particular repository. Segments are assigned to repositories based upon a characteristic of the segments. The characteristic may be the length of the segment or some other value produced by a repeatable, uniformly-distributed function of the segment. The characteristic may be stored on the storage medium along with the segment identifier. The original data may be regenerated by retrieving the segment identifiers and characteristics from the storage medium and retrieving each segment from the repository identified by the characteristic.

14 Claims, 7 Drawing Sheets

U.S. PATENT DOCUMENTS

2006/0282457 A1    12/2006  Williams
2007/0250521 A1*   10/2007  Kaminski ..................... 707/101
2008/0033960 A1*   2/2008   Banks et al. ..................... 707/9
2011/0125771 A1*   5/2011   Gladwin et al. .............. 707/758

FOREIGN PATENT DOCUMENTS

WO    WO 00/57595    *   9/2000

OTHER PUBLICATIONS

Essam Abdel-azeem. et al. "ogra.phic Secarify Evaluation of IWXD4 Rash Fanction", Proceedings of the Thirteenth National Radio ScienceConference, Mar. 19-21, 1996.*

* cited by examiner

METHOD TO DIRECT DATA TO A SPECIFIC ONE OF SEVERAL REPOSITORIES

BACKGROUND

1. Field of the Invention

The present invention relates generally to data storage, and more specifically to techniques for distributing segments of data among multiple storage repositories.

2. Description of the Related Art

Capacity optimization schemes factor objects into parts and plans, and store the parts and plans in an optimized store or repository. Parts that are unique, i.e., have not been previously encountered, are stored. Before a new part is added to the optimized store, the part is compared with the parts already located in the store. Direct comparison is generally too expensive, computationally, to provide useful performance from the factoring process. Instead, the parts are "fingerprinted" using, for example, a cryptographic checksum. When a part is added to the optimized store, its checksum is added to an index of checksums. Before a new part is added to an optimized store, the index is examined. If the checksum is found in the index, then the part is determined to be already in the optimized store and is not added again. To provide useful factoring performance, the index of checksums is typically maintained in computer memory.

Capacity optimization schemes operate on arbitrary binary electronic data by dividing the "original" i.e., initial, unprocessed data into multiple segments, which correspond to the "parts" described above. The segments may vary in size, and the segment boundaries are typically chosen with the goal that the segments correspond to the most repeated, i.e., duplicated, portions of the original data. Then the segments are stored in a segment pool in a repository, i.e., a database, using a relatively small numeric "key" value as a lookup value. The key value may be, for example, a hash value based on data in the segment. The key value is essentially a unique identifier for the segment. A de-duplicated data object. e.g., a file, which corresponds to the "plan" described above, is created, and the key value of each segment is added to the de-duplicated data object in succession. The segment values need not be written to the de-duplicated data. Instead, the segments are stored in the repository, and each segment is stored only once (hence the term de-duplication). Note that data-duplication schemes are also referred to as reduced-redundancy systems.

The de-duplicated data object may, for example, include a file, a data structure in memory, or an object. Each segment need only be stored in the repository once, because the references to that segment in the de-duplicated data object can all be resolved by retrieving the same segment. The de-duplicated plus the data stored in the repository is typically significantly smaller in size than the original data. The original data can be regenerated by sequentially reading the de-duplicated data, i.e., the sequence of key values, retrieving the segment for each key value from the repository, and concatenating the key values together in the order of retrieval.

The Blocklets™ technology of RockSoft (now part of Quantum Corporation of San Jose, Calif.) is an example of a de-duplication scheme. The Blocklets™ scheme uses the term "blocklet" for the segment described above. Blocklets are stored in a "blocklet pool" in a repository similar to the segment pool described above.

When the segment is stored in the segment pool in a repository, an entry is typically made in an index that is also stored in the repository. The size of the index in a data de-duplication scheme may grow to be very large. If the original data is relatively large, then many thousands or millions of segments may be created, and the size of the index may grow beyond the capacity of typical computer systems. The index may become so large that insertions of new segments into the repository and retrieval of existing segments take a substantial amount of time, and performance will consequently suffer. Furthermore, the index or the segment pool may become very large and possibly exceed the storage capacity of a single storage device or server. In particular, the index is typically stored in computer memory for efficient access, and is therefore limited in size by the size of the computer's memory. The access time characteristics of a single index and repository may not scale well as the number of accesses increases, e.g., as a result of large numbers of users or high frequency of access. That is, the index and repository become a bottleneck to system throughput as the usage load increases. Furthermore, the index and repository are a single point of failure in that a failure of the computer or storage system providing the index and repository may lead to temporary or permanent loss of the original data. Therefore, when the amount of data stored by a de-duplication scheme is large, or the frequency of access is high, it would be desirable to be able to increase the performance and reliability of data de-duplication schemes.

SUMMARY

In general, in a first aspect, the invention features segment distribution logic for distributing data segments to storage repositories. The logic includes segmentation logic for dividing data into at least one segment according to a segmentation scheme, characteristic generation logic for generating a characteristic based upon the at least one segment, where the characteristic generation logic is operable to repeatedly produce the same characteristic for the same segment, and the characteristic generation logic is further operable to generate a substantially uniform distribution of characteristics for different segments, repository selection logic for generating a repository identifier based upon the characteristic, and communication logic for communicating the at least one segment to a repository identified by the repository identifier.

Embodiments of the invention may include one or more of the following features. The characteristic may comprise a cryptographic hash value based upon the at least one segment, a simpler hash value based upon the at least one segment, or a length of the at least one segment. The repository selection logic may select the repository identifier, based upon the characteristic, from a mapping table. The repository identifier may be based upon the characteristic modulo a number of repositories. The segment distribution logic may further comprise output logic for storing on a storage medium at least one segment identifier that refers to the at least one segment of data, wherein the segment identifier comprises the repository identifier and a key based upon the at least one segment of data. The output logic may generate the key using a hash function. The repository may be located on a remote computer.

In general, in a second aspect, the invention features segment re-assembly logic for re-assembling original data from segments distributed across multiple repositories, the logic comprising segment identifier retrieval logic for retrieving at least one characteristic from a storage medium, repository selection logic for generating at least one repository identifier based upon the at least one characteristic; and communication logic for receiving at least one segment of data from at least one repository identified by the at least one repository identifier.

Embodiments of the invention may include one or more of the following features. The characteristic may comprise a cryptographic hash value based upon the at least one segment of data, a simpler hash value based upon the at least one segment of data, or a length of the at least one segment of data. The repository selection logic may select the repository identifier, based upon the characteristic, from a mapping table. The repository identifier may be based upon the characteristic modulo a number of repositories. The segment identifier retrieval logic may be further operable to retrieve from the storage medium at least one key associated with the at least one repository identifier, and the at least one segment of data is identified in the repository by the at least one key.

In general, in a third aspect, the invention features a method of distributing at least one segment of data across multiple repositories in a data storage system, the method comprising generating a segment identifier based upon the at least one segment of data wherein the segment identifier comprises a key and a repository identifier, and the key and the repository identifier are based upon the at least one segment of data, generating a characteristic based upon the at least one segment of data, using a characteristic generation method that is capable of repeatedly producing the same characteristic for the same segment and that is capable of producing a substantially uniform distribution of characteristics for different segments, generating the repository identifier based upon the characteristic, and communicating via a communication network the segment identifier and the segment of data to a repository identified by the repository identifier.

Embodiments of the invention may include one or more of the following features. The characteristic may comprise a cryptographic hash value based upon the at least one segment of data, a simpler hash value based upon the at least one segment of data, or a length of the at least one segment of data. Generating the repository identifier may comprise selecting the repository identifier, based upon the characteristic, from a mapping table. The repository identifier may be based upon the characteristic modulo a number of repositories. The method of distributing at least one segment of data may further comprise storing the identifier on a storage medium.

In general, in a fourth aspect, the invention features a method of regenerating at least one segment of data in a data storage system, the method comprising retrieving at least one segment identifier from a storage medium, wherein the at least one segment identifier comprises a hash value and a characteristic, generating a repository identifier based upon the characteristic, communicating the identifier to a repository identified by the repository identifier via a communication network, and receiving at least one segment of data from the repository via the communication network, wherein the at least one segment of data corresponds to the hash value.

Embodiments of the invention may include one or more of the following features. The characteristic may comprise a cryptographic hash value based upon the at least one segment of data, a simpler hash value based upon the at least one segment of data, or a length of the at least one segment of data. Generating the repository identifier may comprise selecting the repository identifier, based upon the characteristic, from a mapping table. The repository identifier may be based upon the characteristic modulo a number of repositories.

In general, in a fifth aspect, the invention features a computer program product comprising program code for distributing data segments to storage repositories, the program code comprising dividing data into at least one segment according to a segmentation scheme, generating a characteristic based upon the at least one segment, using a technique that is repeatable and produces a uniform distribution of characteristics, generating a repository identifier based upon the characteristic, and communicating the at least one segment to a repository identified by the repository identifier.

Embodiments of the invention may include one or more of the following features. The characteristic may comprise a cryptographic hash value based upon the at least one segment, a simpler hash value based upon the at least one segment, or a length of the at least one segment. Generating the repository identifier may comprise selecting the repository identifier, based upon the characteristic, from a mapping table. The repository identifier may be based upon the characteristic modulo a number of repositories. The program code may further comprise storing on a storage medium at least one segment identifier that refers to the at least one segment of data, wherein the segment identifier comprises the repository identifier and a key based upon the at least one segment of data.

In general, in a sixth aspect, the invention features a computer program product comprising program code for re-assembling segments distributed across multiple repositories to form original data, the program code comprising retrieving at least one characteristic from a storage medium, generating at least one repository identifier based upon the at least one characteristic, and receiving at least one segment of data from a repository identified by the repository identifier.

DETAILED DESCRIPTION

The following description is presented to enable any person skilled in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
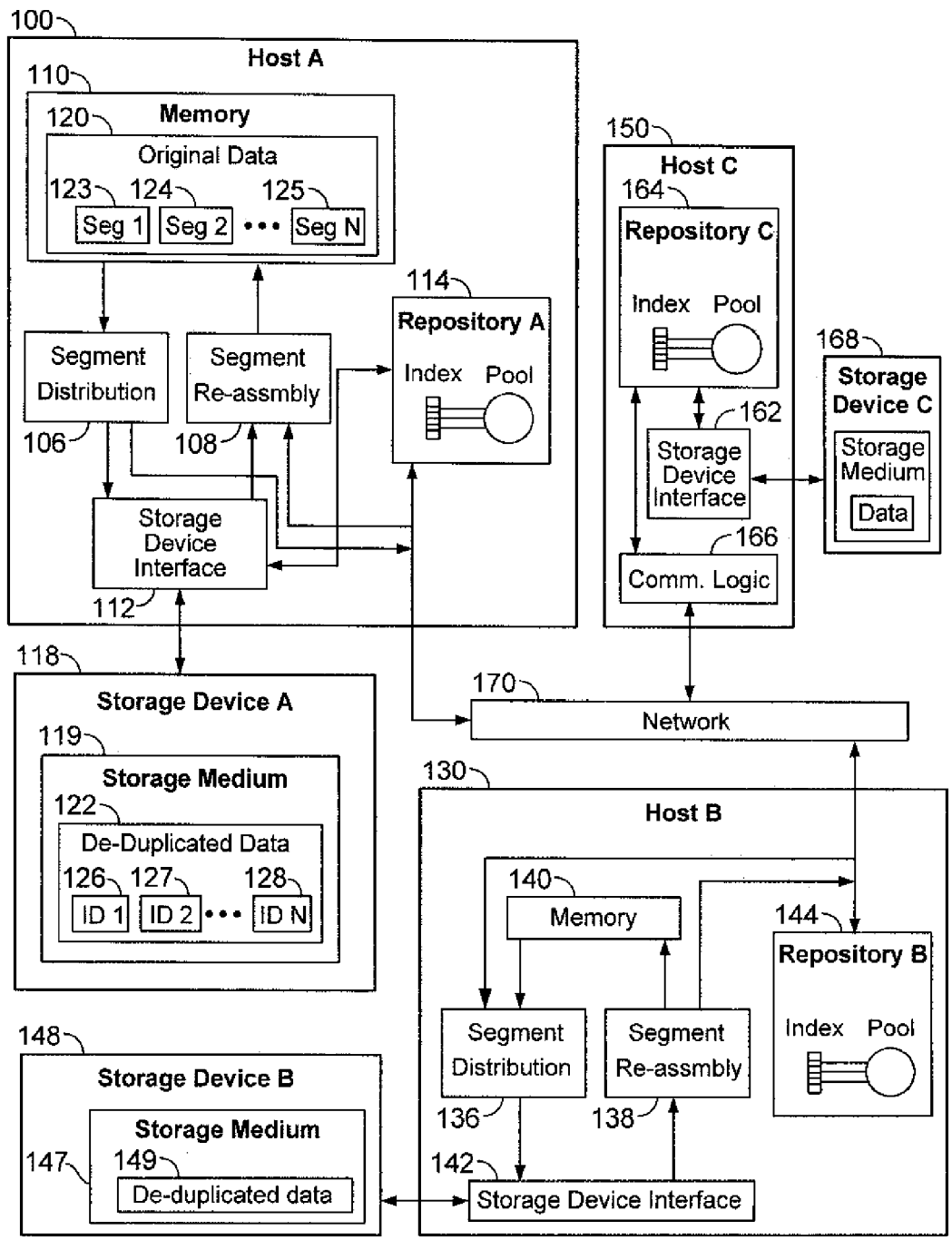
FIG. 1 is an illustrative drawing of distributed repositories on multiple hosts in a reduced-redundancy system.

FIG. 1 is an illustrative drawing of distributed repositories on multiple hosts in a reduced-redundancy system. The hosts 100, 130, 150 of FIG. 1 are, for example, computing systems, as described below with respect to FIG. 7. The hosts 100, 130, 150 communicate via a network 170, such as the Internet, a local area network, a wireless network, or any other type of computer network.

Host A 100 communicates with a storage device A 118 via a storage device interface 112. The storage device A 118 includes storage medium 119, which may be removable, e.g., a tape, or non-removable, e.g., a disk or memory. Host A includes a Repository A 114 for storing data segments in a segment pool. An index associated with the segment pool provides for retrieval of segments by an associated key value. The segments stored in the segment pool are typically stored on a persistent storage medium such as the storage medium 119. The index may be stored in the memory 110 or on a storage medium such as the storage medium 119. The storage capacity of the memory 110 is typically smaller than the storage capacity of the storage medium 119. Multiple storage devices may be used by Host A 100, such as additional storage devices (not shown) or remote storage devices (not shown) accessible via the network 170. Repository A 114 may store the repository contents on any of these additional or remote storage devices.

Host B 130 is similar to Host A. Host B 130 communicates with a storage device B 148, which may include a storage medium 147 that stores data 149. Host B includes a Repository B 144 for storing segments in an indexed segment pool. Repository B 144 may store its contents (e.g., segments) on the storage medium 147, or on another local or remote storage device, as described above with reference to Repository A 114. Host C 150 provides a Repository C 164 which stores its contents in a storage device C 168. Host C acts as a repository but does not perform data de-duplication. The reduced redundancy system may include more or fewer hosts than are shown in FIG. 1. The particular three-host configuration with three repositories is shown as an example. Not all hosts in the system need include repositories, and not all hosts need include all of the components shown in Host A 100 or Host B 130. Furthermore, more than one repository may reside on a single computer or host, in which case the repositories on the same host would operate independently, using separate indexes, for example, and separate storage files or database tables. The repositories on the same host may share the host's resources, such as storage space, CPU, and network interfaces.

In one example, one of the hosts, e.g., Host A 100, receives original data 120 in a memory 110, e.g., by reading the data from a storage device 118, or by receiving the data from a user (not shown), or by receiving the data from a network 170. The original data is, for example, an arbitrary sequence of bytes. The reduced-redundancy system identifies redundant segments of the original data and produces a de-duplicated representation 122 of the original data 120. The de-duplicated representation is, for example, a sequence of "identifiers" 126, 127, 128 that refer to the segments of the original data. The segments are stored in repositories on the hosts. For example, some of the segments may be stored in Repository A 114 on Host A 100, some in Repository B 144 on Host B 130, and some in repository C 164 on Host C 150.

A characteristic 225 (i.e., a property) of each of the original data segments 123, 124, 125 is used as input to repository selection logic 222 that generates a repository identifier value 226 that identifies the repository that will store the segment. In one example, the selection of a repository for storage of the segment (and, optionally, storage of the identifier) is based on selecting a characteristic 225 of a segment 218, where the characteristic generation logic 224 or method exhibits the properties of repeatability, uniform distribution and ease of computation. A logic function or operation is repeatable if the function or operation generates the same result value every time the function or operation is applied to the same input value. A characteristic 225 is repeatable if the same characteristic 225 is produced every time the characteristic is evaluated for the same input data (e.g., for the same segment 218). The characteristic 225 may be, for example, the size of the part 218 (e.g., the length in bytes of the segment 218), a cyclic redundancy check (CRC) value of the part 218, and cryptographic hash value of the part 218 (e.g., SHA1 or MD5), or a non-cryptographic hash value of the part 218 (e.g., a hash function that takes less time to compute than a cryptographic hash function). Those characteristics would be generated by characteristic generation logic 224 or a by characteristic generation method using a length function, a CRC function, a cryptographic hash function, and a simpler hash function, e.g., of the type used for storing data in hash tables, respectively. The length or size of the part 218 is easily computed, is repeatable, i.e., reproducible, and may produce a uniform distribution. The CRC value is repeatable, uniformly distributed and computationally inexpensive. Cryptographic hashes or checksums are repeatable and uniformly distributed, but may be computationally expensive. However, a cryptographic hash or checksum may be available in data-duplication systems as the hash value generated for each part. Therefore, a cryptographic hash may be used to generate the characteristic 225 of the segment 218 with little additional computational burden in a data de-duplication system. A simpler type of hash function, i.e., a non-cryptographic hash function, may similarly be used to generate a simpler hash value for use as the characteristic 225. The simpler hash function may use an addative method or a rotative method to process the data and generate the simpler hash value. For example, the simpler hash function may traverse its input data (e.g., a data segment 218) and, for each byte of input data, multiply the byte by a prime number and add the result to a sum. After all bytes of the input data have been processed, the sum is the simpler hash value. A checksum or CRC value may be computed similarly and used as the characteristic 225.

The repository selection logic 222 generates a repository identifier 226 based upon the characteristic 225. That is, the characteristic 225 used to select the repository in which the segment 218 is stored. In one example, the repository selection logic 222 may generate the repository identifier 226 using a modulo operation on the characteristic 225. The modulo operation may, for example, select an appropriate quantity of the least significant bits of the characteristic 225 to form the repository identifier 226. In one example, the repository identifier 226 is a number to be used to directly address the repository. In some examples, the repository identifier 226 may be an instance number of the repository that is converted to a repository address by additional logic. In other examples, the repository identifier 226 may be a network address of a repository, in which case the repository selection logic 222 may produce an index into a mapping table, where the index selects a repository address from the mapping table.

The repository selection logic 222 may use any technique that maps a numeric characteristic value to a repository identifier. In one example, there are fewer repositories than possible characteristic values, so the characteristic 225 is reduced in size to select a repository. The repository selection logic 222 may select one or more ranges of bits from the characteristic 225 to form a new number to be used to address the repository. The repository selection logic 222 may select digits (in a repeatable manner, e.g., according to a predefined formula) from the characteristic 225 to form a new number that selects the repository. The repository selection logic 222 may select digits of the characteristic by using an exclusive or (XOR) operation to select ranges of bits (in a repeatable manner, e.g., according to a formula) from the characteristic 225 to form a repository address. The repository selection logic 222 may use a combination of those operations, e.g., a bit selection followed by an XOR operation, to produce the repository identifier 226.

In one aspect, a key value 232 (e.g., a hash value) for each segment 218 is generated to identify the segment within the repository in which the segment is stored. Each repository includes an index that maps key values of the segments to the locations of the segments in a block pools managed by the repository. The characteristic and hash value of each of the segments 262 are stored as an "identifier" in the de-duplicated data 260 in a positions (e.g., sequential positions) that corresponds to the position of the segment 218 in the original data 120. That is, the identifiers are written to the de-duplicated data 260 in the same order that their corresponding segments occur in the original data 120.

The storage space used by the de-duplicated data 260 combined with the storage space used by the segments 258 and hash table entries 254 in the repositories is typically substantially smaller than the storage space used by the original data 204, e.g., by a factor of 10 to 20 or more. The original data 204 may be removed from memory (e.g., from the storage medium 119 and from the memory 202) after the de-duplicated data 260 has been stored and the segments 258 have been stored in the repositories 252. Subsequently, the original data 204 can be re-constituted from the de-duplicated data 260 and the segments 258 in the repositories 242 by reading the identifiers 260 from the de-duplicated data stored on the storage medium 259. In one example, each segment may be retrieved by using the characteristic value included in each identifier 262 to select a repository 242 according to the same method used to select the repository 242 when the segment 218 was stored, by sending the hash value included in the identifier to the repository (typically via the communication network 130 if the repository is on a remote computer, i.e., a different computer that is accessible via a network), and by receiving the segment from the repository via the network 130.

In one example, segment distribution logic 106 located on Host A 100 (i.e., available to be executed on Host A 100) performs de-duplication of the original data 120 into distributed segments by defining the segments, generating the identifiers 126, 127, 128, sending the segments to the appropriate repositories, and storing the identifiers 126, 127, 128 in the de-duplicated data 122. The segment distribution logic 106 may send each of the segments 123, 124, 125 to a selected repository, such as repository A 114, repository B 144, or repository C 164. As described above, the repository may be selected based upon a characteristic of each of the segments 123, 124, 156. If the selected repository is located on a remote computer, e.g., repository C 164 on host C 150, the segment distribution logic 106 sends the segment to the remote computer via a communication network 170. Segment distribution logic 136 located on Host B 130 is similar to the segment distribution logic 106 and performs de-duplication of original data 149 located on a storage medium 147 accessible in a storage device B 148 accessible by Host B 130. The segment distribution logic 136 on Host B 130 may store de-duplicated data on, for example, the storage medium 147. In other examples, the segment distribution logic 106, 136 may send the de-duplicated data to a repository for storage, such as Repository A 114 or Repository C 164 via the network 170. That is, the original and de-duplicated data may be stored on any storage device, such as a disk, tape, or memory, accessible to a host or repository. The original data 120 and the de-duplicated data 122 are shown stored on the storage device A 118 for illustrative purposes.

In one example, segment reassembly logic 108 located on host A 100 reads or receives the de-duplicated data 122 from the storage medium 119 (or from some other source). The segment reassembly logic 108 re-assembles the de-duplicated data 122 to by retrieving the segments referenced by the identifiers 126, 127, 128 from the corresponding repositories referenced by the identifiers, such as repository A 114. If one or more of the referenced segments is stored on a remote computer (e.g., on a repository or a storage device located on a remote computer, the segment reassembly logic 108 receives the segment from the remote computer via the communication network 170. The retrieved segments are reassembled to form re-assembled data 149 by combining or concatenating the segments in the order of their corresponding segment identifiers 126, 127, 128. The re-assembled data (not shown) is essentially equivalent to the original data 123. The re-assembled data may be stored in the memory 140 or on the storage medium 147, or on any other storage device accessible to the host on which the segment re-assembly logic is located. Re-assembly may be performed on any host that can access the de-duplicated data and the repositories in which the corresponding segments are stored. For example, host B 130 may include segment re-assembly logic 138, and may perform de-duplication of data stored on the storage device 148, such as de-duplicated data 149, and may store some or all of the re-assembled data (not shown) in the memory 140 on host B 130. The re-assembled data may also be stored on the storage medium 147 on host B, or on the storage medium 119 on host A, or on the storage medium on device C 168. The re-assembled data may be stored on a different host by, for example, sending the data in a message to the repository on which the data is to be stored.

Figure 2:
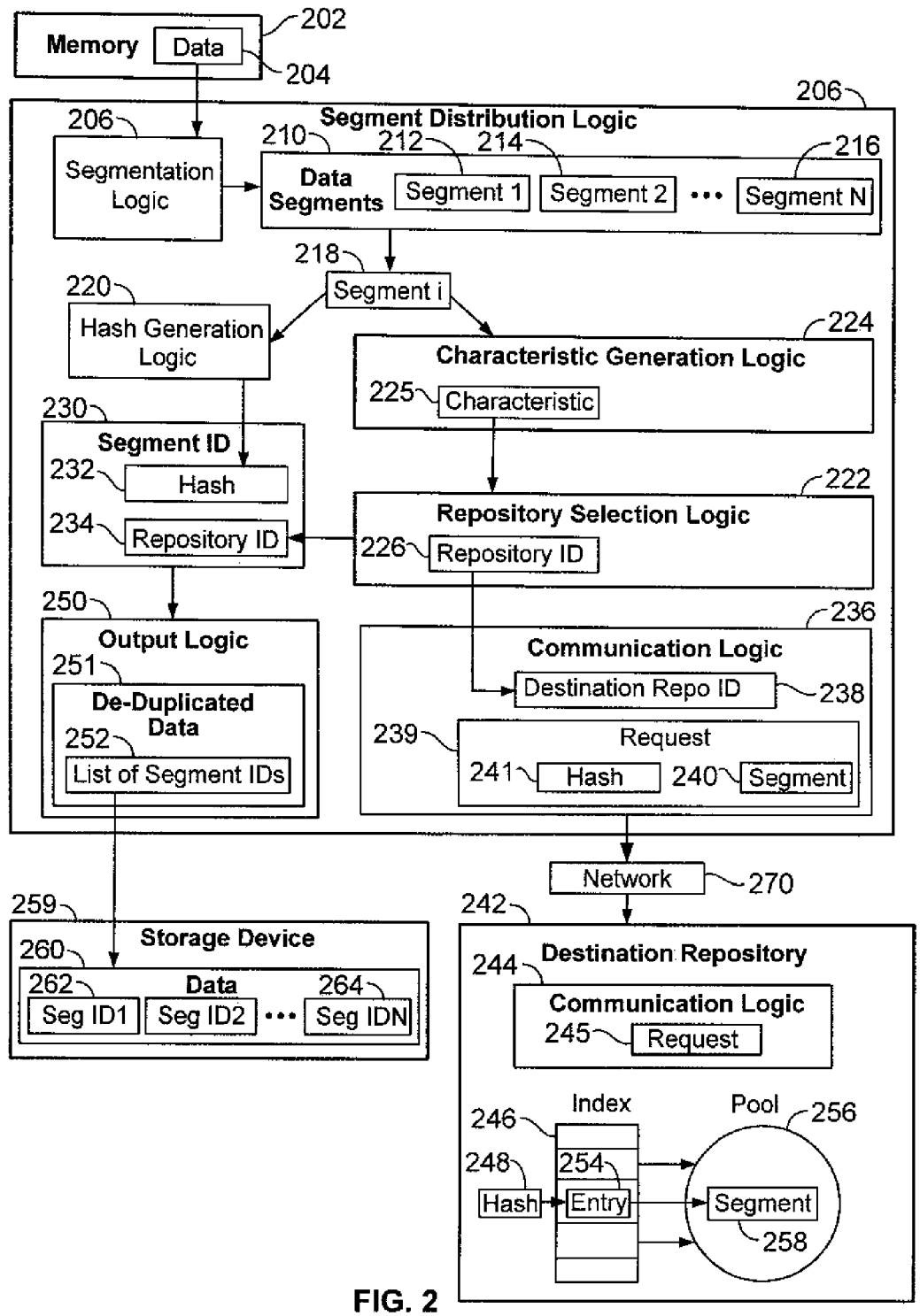
FIG. 2 is an illustrative drawing of segment distribution logic for distributing data segments to remote repositories via a communication network in accordance with embodiments of the invention.

FIG. 2 is an illustrative drawing of segment distribution logic for distributing data segments to remote repositories via a communication network in accordance with embodiments of the invention. The segment distribution logic 206 of FIG. 2 corresponds to the segment distribution logic 106, 136 of FIG. 1. The segment distribution logic 206 includes segmentation logic 208, hash generation logic 220, repository selection logic 222, communication logic 236, and data de-duplication output logic 250. The segmentation logic 208 receives original data 206, e.g., from a memory 202 or from a storage device, and generates a list of data segments 210. The segmentation logic 208 partitions the original data 206 into segments according to de-duplication techniques known to those skilled in the art, such as the technique disclosed in U.S. Pat. No. 5,990,810 to Williams, which is incorporated herein by reference in its entirety. Note that the segments described herein are referred to as subblocks in the Williams patent.

The list of segments 210 includes Segment 1 212, Segment 2 214, and Segment N 216. The list of segments may include any number of segments, but three are listed here for illustrative purposes. The segment distribution logic 206 processes each segment 218 in the list of segments 210 by creating a corresponding segment identifier 230 that includes the hash value 232 and a repository identifier 234. The hash generator 220 generates the hash value 232, using, for example, a cryptographic checksum generator, such as an MD5 or SHA1 generator. The repository identifier 234 is generated by repository selection logic 222. In this example, the repository selection logic 222 generates a repository identifier 226, which is also used as the repository identifier 234 in the segment identifier 230.

The repository selection logic 222 generates the repository identifier 226 based upon a characteristic of the segment 218. The repository identifier 226 may be, for example a numeric value that identifies a repository (e.g., "1" for repository number 1), or Uniform Resource Locator (URL) that identifies a repository server instance on an Internet host (e.g., http://hostname/instancename). In the example of FIG. 2, the repository selection logic 222 sets the repository identifier 226 to the length of the data in the segment modulo the number of repositories. Therefore, the repository identifier 226 will vary uniformly across the repositories, and will be the same for equivalent segments. In this example, there are 3 repositories, and the repository identifier is a number that identifies the repository, e.g., 1 for the first repository, 2 for the second repository, and 3 for the third repository. For example, a segment with a data length of 4 would correspond to a characteristic value of 1 (4 modulo 3), and would therefore be stored on the first repository. In this example, the repository identifier is generated based upon a modulo operation of a characteristic of the segment data. In other examples, the repository identifier 226 may be based upon the length of the segment 218 in bytes, or the CRC value of the segment 218, or a cryptographic checksum value (e.g., SHA1) of the segment 218. In still other examples, the repository identifier 226 may be generated by selecting one or more ranges of bits from the characteristic to form a number that may be used to address the repository, or by selecting digits (in a formulaic, i.e., deterministically repeatable manner) from the characteristic to form a new number that identifies a specific repository or addresses the repository, or by using an exclusive-or (XOR) operation on ranges of bits (selected in a formulaic manner) from the characteristic to form a new number that identifies or addresses the repository. The repository identifier may be generated by combinations of such operations and by any other operation that is repeatable, i.e., produces the same result each time the operation is applied to a particular data segment.

As described above, the size of data 204 is reduced by creating a "de-duplicated" representation of the data. The de-duplicated representation is shown in FIG. 2 as de-duplicated data 251. In one example, the de-duplicated data 251 includes a list of segment identifiers 252.

In one example, the output logic 250 adds the segment identifier 230 to the list of segment identifiers 252 to create the de-duplicated data 251. The segment identifiers 252 may be stored on, for example, a storage device 259 such as a disk, tape or memory, or may be stored in a repository such as the remote repository 242. In FIG. 2, the segment identifiers 252 are stored on the storage device 259 as de-duplicated data 260. Each segment identifier, such as a first segment identifier 262, refers to a corresponding data segment, e.g., segment 1 212 of the original data 204.

In one example, communication logic 236 communicates the hash 232 and the segment 218 (and optionally, the repository identifier 234) by sending a request 239 containing the hash 232 and the segment 218 (and optional repository identifier 234) to the remote repository 242 via a communication network 270. The specific repository to which the request is communicated is identified by a destination repository ID 238. In one example, the segment 218 may be written to a storage device associated with the local computer on which the segment distribution logic is executing, or to a repository located on the local computer, in which case the segment need not be sent to a remote repository 242. In one example, the communication logic 236 selects the address of the remote repository 242 based upon the repository identifier 234. In another example, the communication logic 236 selects the address of the remote repository 242 based upon the hash value 232.

In one aspect, the communication logic 236 sends the segment in a request 239 to the selected remote repository 242 via the communication network 270. At the remote repository 242, communication logic 244 receives the request 239 (shown as a receive request 245) from the network 270. The communication logic 244 extracts the hash value 241 and the segment 240 from the received request 245. The repository 242 stores the segment 240 as a stored segment 258 in a segment pool 256. The segment pool 256 is, for example, a region of memory or space on a storage medium in which data can be stored and retrieved to and from memory locations identified by addresses, which are typically numeric values that uniquely identify corresponding memory locations. The repository 242 creates an index entry 254 that refers to or points to the location (in memory or on a storage medium) at which the received segment 240 is stored. Although a hash index and a block pool are used in this example, other techniques may be used, such as search trees or other storage techniques known to those skilled in the art of data storage. The segment 258 can subsequently be retrieved from the repository by querying the index for the hash value 241 to retrieve the index entry 254 that contains the location of the segment 258 in the segment pool 256. The subsequent index query will return the entry 254, which contains the reference or pointer to the segment 258.

In one example, this technique allows each of the data segments 210 to be stored on a different repository. When data segments 210 are stored the characteristic generation logic 224 selects a repository based upon a characteristic of each of the segments 210. The data is stored in a de-duplicated form as a list of segment identifiers that refer to the segments by their repository and hash value within the specified repository. When the de-duplicated data is read from a storage medium, the original data segments 210 may be retrieved from the repository or repositories (or other storage device) using the information stored in the segment identifiers. The segment identifier's characteristic identifies the repository on which the segment is stored. The segment identifier's hash value identifies the segment within that identified repository. For example, segment 1 212 may be stored in the repository 242 at a location identified by the hash value 253. Other segments of the same data 204 may be stored in different repositories. Segment 2 214, for example, may be stored in a different repository. For example, if the characteristic of segment 1 210, e.g., the length of the segment in bytes, is mapped to the value "1" by the characteristic generation logic 224, and the characteristic of segment 212 (the segment's length in bytes) is mapped to the value "2" by the characteristic generation logic 224, then segment 1 210 will be stored on the repository that is identified by the value "1", and segment 2 212 will be stored on the (possibly different) repository that is identified by the value "2".

Figure 3:
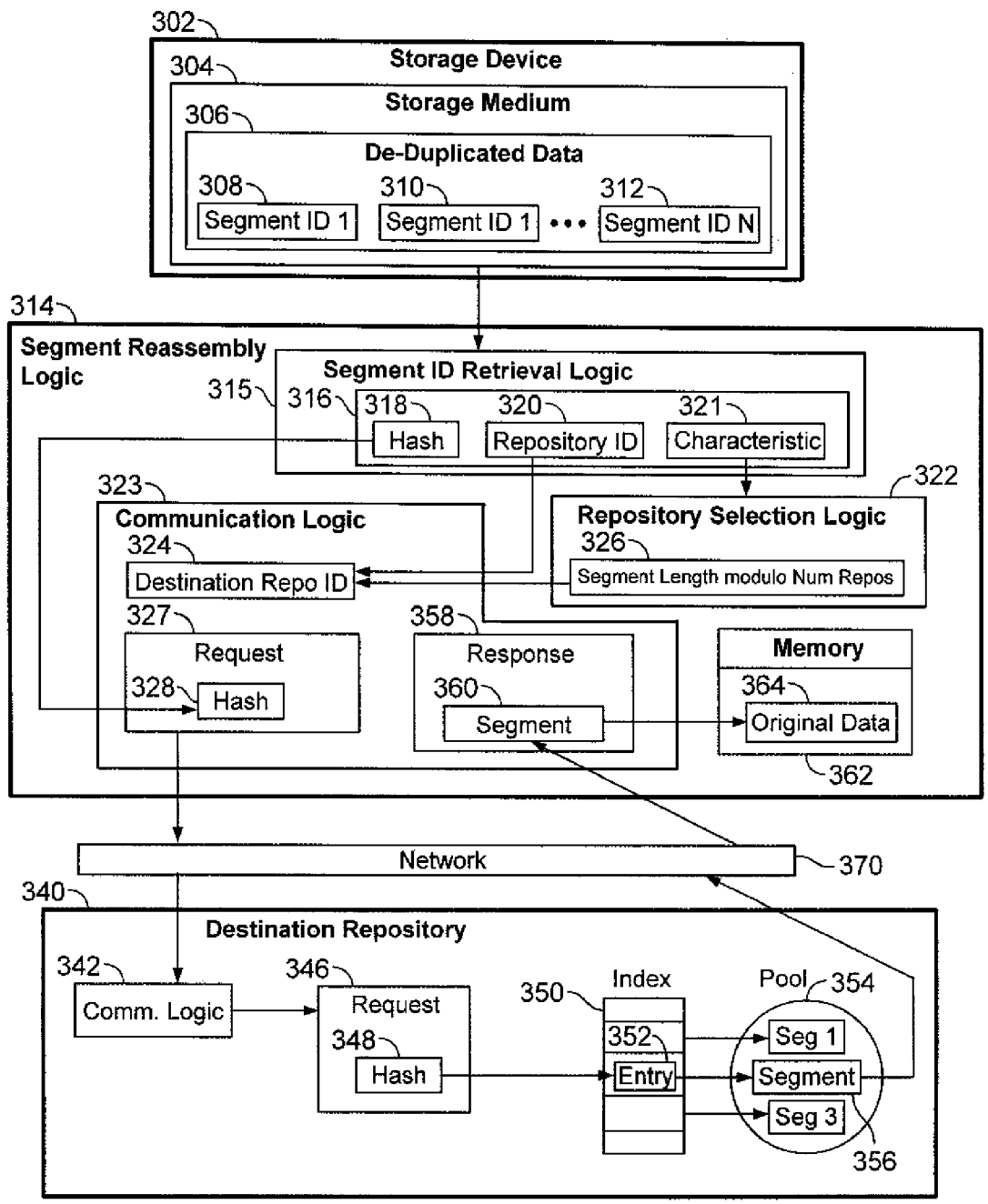
FIG. 3 is an illustrative drawing of segment re-assembly logic for retrieving data segments from remote repositories via a communication network in accordance with embodiments of the invention.

FIG. 3 is an illustrative drawing of segment re-assembly logic for retrieving data segments from remote repositories via a communication network in accordance with embodiments of the invention. The segment re-assembly logic 314 of FIG. 3 corresponds to the segment re-assembly logic 108, 138 of FIG. 1. The segment re-assembly logic 314 receives de-duplicated data 306, which includes, for example, a first segment identifier 308, a second segment identifier 310, and an Nth segment identifier 312, and produces re-assembled original data 364. The segment re-assembly logic 314 stores the re-assembled original data 364 in, for example, a memory 362. The original data 364 stored in the memory may represent all or a portion of the original data 120 of FIG. 1. Three segment identifiers are shown for descriptive purposes; any number of segment identifiers may be present. The segment identifiers 308, 310, 312 may be retrieved from a storage medium 304 associated with a storage device 302, such as a disk drive, a tape drive, a memory, or a network-accessible file server.

In some examples, the segment identifier 316 includes a characteristic of the segment. In other examples, the segment identifier 316 includes a repository identifier. The segment re-assembly logic 314 includes segment identifier retrieval logic 315, which receives each segment identifier 316 from the storage device 302.

If the segment identifier 316 includes a characteristic (e.g., the repository identifier was not written to the storage medium, but a characteristic of the segment was written), then repository selection logic 322 generates a repository identifier 326 (as described above with reference to the repository selection logic 222 of FIG. 2). The repository identifier 326 is used by the communication logic 323 as the destination repository identifier 324 to identify the repository on which a particular segment referenced by the segment identifier 316 is stored. If the segment identifier 316 includes a repository identifier (e.g., the repository identifier was stored on the storage medium when the segment identifier was written), then the repository selection logic 322 is not necessary, and the repository identifier read from the segment identifier is used as the destination repository identifier 324 by the communication logic 323.

The segment re-assembly logic 314 includes communication logic 323 for requesting and receiving segments from remote repositories when the characteristic 320 of a segment indicates that the segment is stored on a remote repository. If the characteristic 320 of a segment identifier 316 indicates that the segment is stored locally (e.g., a characteristic value that corresponds to the local host), the segment reassembly logic 314 may request and receive the segment from a local repository, or from local memory 362, using storage techniques known to those skilled in the art (e.g., hash table indexes and block pools stored in memory 362, using the hash 318 to store the segment in the hash table). As the original data 120 is re-assembled, the segments of the original data 120 are stored in the memory 362 or on a storage device or repository accessible by the host (not shown) on which the segment re-assembly logic 314 is located.

For each segment identifier 316 that refers to a segment stored on a remote repository (e.g., according to the segment identifier's characteristic 320), the communication logic 323 creates a request 327 that includes the hash value 318 portion of the segment identifier 316. As in the segment distribution logic 206 of FIG. 2, the communication logic 323 sends the request 327 to the repository address 324 that corresponds to the characteristic 320. In other examples, additional repository selection logic (not shown) may perform further steps to select a repository based upon the characteristic 320, in which case repository selection logic should also be present in the segment distribution logic 206 so that both the segment distribution logic 206 and the segment re-assembly logic 314 will select the same repository for the same segment characteristic. In the example shown in FIG. 3, the segment re-assembly logic 314, the characteristic 320 is retrieved from the segment identifier 316 that was generated by the segment distribution logic 206 of FIG. 2.

In one example, communication logic 342 located on the destination repository 340 receives the request 327 via the communication network 370, extracts the hash value 348 from the request, looks up the hash value 348 in the index 350 to find an entry 352 that specifies the location of the corresponding segment 356 in the segment pool 354, retrieves the segment 356, and sends the segment 356 back to the requesting communication logic 323 as a segment 360 in a response 358. The requesting communication logic 323 receives the response, extracts the segment 360, and stores the segment 360 as part of the reconstructed original data 120. For example, the communication logic 323 may append the segment 360 to the reconstructed original data 364 in the memory 362, or may append the segment 360 to a disk file to create a reproduction of the original data 120.

Figure 4:
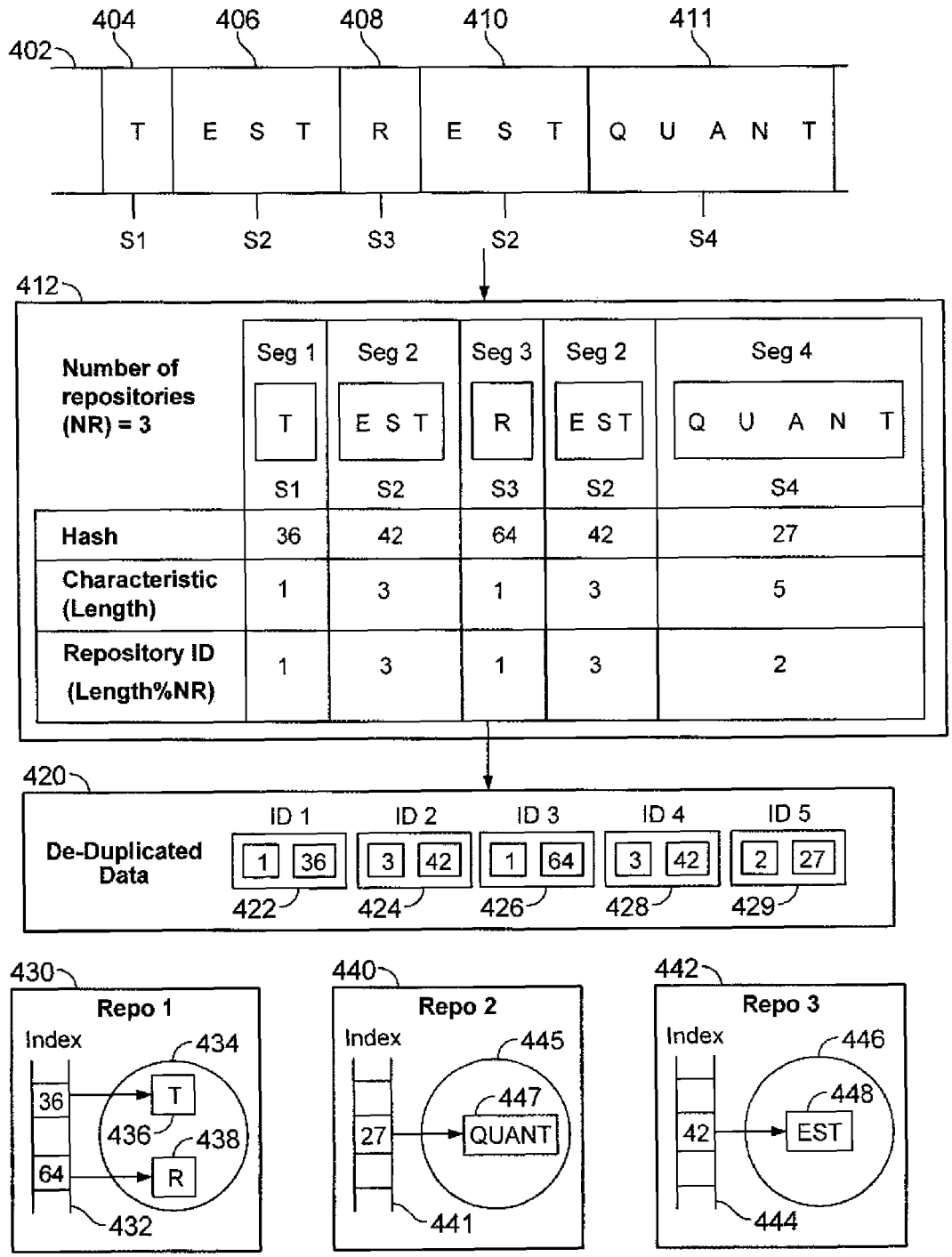
FIG. 4 is an illustrative drawing of a data de-duplication example with storage of segments in multiple repositories in accordance with embodiments of the invention.

FIG. 4 is an illustrative drawing of a data de-duplication example with storage of segments in multiple repositories in accordance with embodiments of the invention. Original data 402 is a 13-character string with the value TESTRESTQUANT. The data has been divided into segments. The segments include a first segment 404 with the data T, a second segment 406 with the value EST, a third segment 408 with the value R, a fourth segment 410 with the value EST, and a fifth segment 411 with the value QUANT. The fourth segment 410 ("EST") need not be stored as a separate segment because the second segment 406 has the same value. The hash values assigned to the first, second, third, fourth, and fifth segments, respectively, are 36, 42, 64, 42, and 27. The hash values are assigned by a hash function, for example.

In this example, the characteristic of each segment is the length of the segment in characters. The length of the first segment, "T", is 1 character, so the characteristic of the first segment is 1. The length of the second segment, "EST", is 3 characters, so the characteristic of the second segment is 3. The length of the third segment, "R", is 1 character, so the characteristic of the third segment is 1. The length of the fourth segment, "EST", is 3, so the characteristic of the fourth segment is 3. The length of the fifth segment, "QUANT", is 5, so the characteristic of the fifth segment is 5.

Note that the characteristic of each segment may be independent of the segment's hash value, so the characteristic may need to be evaluated even if the segment is a duplicate of a previous segment, because the characteristic may depend on properties of the segment that do not affect the hash value. For example, when the characteristic is based on the length of the segment, the characteristic will be the same for segments that are considered duplicates according to the hash value.

In the example of FIG. 4, the segment characteristic is transformed to a repository identifier by a modulo operation that ensures the repository identifier is in a specified numeric range. The operation "X modulo Y" can be understood as a reduction of the value X to a value less than or equal to Y. There are three repositories 430, 440, 442 in this example, so the number of repositories is 3. In this example, the repository identifier is generated as the characteristic modulo the number of repositories, and the number of repositories (NR) is 3, so the repository identifier is always in the range 0 to 3. The lengths of T, EST, and R are less than or equal to 3, so the modulo operation does not change their value, and the repository identifier is equal to the lengths for those segments. However, the length of QUANT is 5, and 5 modulo 3 is 2 (i.e., the remainder of 5 divided by 3 is 2), so the repository identifier assigned to the value QUANT is 2.

In the example of FIG. 4, the de-duplicated data 420 includes segment identifiers for each of the segments 404, 406, 408, 410, 411. In this example, the segment identifiers appear in the same order as the corresponding segments of the original data 120. The first segment identifier 422 includes the repository identifier "1" and hash value "36" of the first segment. The second segment identifier 424 includes the repository identifier "3" and hash value "42" of the second segment. The third segment identifier 426 includes the repository identifier "1" and the hash value "64" of the third segment. The fourth segment identifier 428 includes the repository identifier "3" and the hash value "42" of the fourth segment. The fifth segment identifier 429 includes the repository identifier 2 and the hash value 27 of the fifth segment. In another example, the characteristics may be stored in the de-duplicated data 420 instead of the segment identifiers, in which case the retrieval logic that reconstructs the original data would recalculate the repository identifiers using the same transformation as is used when the de-duplicated data is stored. In other examples, the order in which the segment identifiers appear in the de-duplicated data may differ from the order in which the corresponding segments appear in the original data 402, but when the order differs, a position and length of the segment may be stored with each segment identifier in the de-duplicated data 420 so that the segments can be re-assembled in their original order. The position and length allow the segment re-assembly logic 314 of FIG. 3 to process the segment identifiers in any order, and to store the retrieved segment in the re-created data in any order. Furthermore, when the segment identifiers include the position and length of each segment, the segment re-assembly logic 314 may execute in parallel on multiple processors that re-assemble the original data in parallel by writing segments to a shared file, so that the re-assembly process can be sped up.

In one example, as described above, each segment 404, 406, 408, 410, 411 is stored in a repository that is selected based upon the characteristic associated with the segment. The segments with characteristic "1" are stored in repository number "1" 430. The first segment 404 is stored as an entry 436 in a segment pool 434 located at repository number "1", and the location of the entry is specified by a key entry in the index 432 with the value "36" (the segment's hash value). That is, the first segment 404 may be retrieved efficiently by querying repository number "1" 430 for the segment with hash value "36". The third segment 408 is stored as an entry 438 in the segment pool 434 of repository "1" 430, and the location of the third segment's entry is specified by a key entry in the index 432 with the value "64" in that repository's index 432.

The second segment 406 is stored in repository number "3" 442 as an entry 448 in that repository's segment pool 446. The location of the entry 448 within the repository is specified by a key entry in the index 444 with the value "42". That is, the second segment 406 may be retrieved efficiently by querying the repository number "3" 442 for the segment with hash value "42". The second segment identifier 424, for example, can therefore be used to retrieve the second segment 406 using the repository number, 3, and hash value, 42, contained in that segment identifier 424.

The fifth segment 411 is stored in repository number "2" 440 as an entry 447 in that repository's segment pool 445. The location of the entry 447 within the repository is specified by a key entry in the index 444 with the value "27". That is, the fifth segment 411 may be retrieved efficiently by querying repository number "2" 442 for the segment with hash value "27". The fifth segment identifier 429, for example, can therefore be used to retrieve the fifth segment 411 using the repository number, 2, and hash value, 27, contained in that segment identifier 429.

Figure 5:
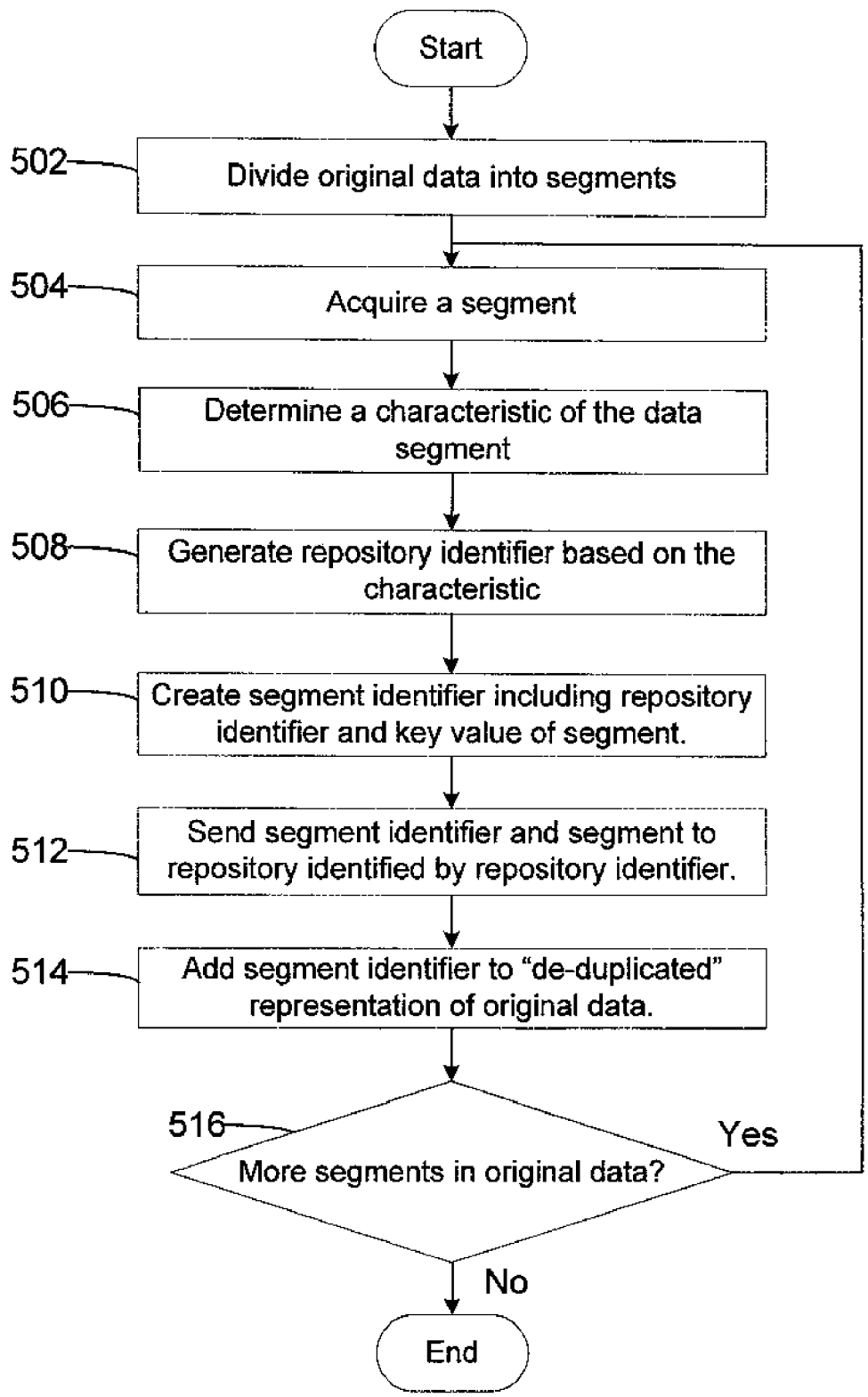
FIG. 5 is an illustrative flow diagram of a segment distribution process in accordance with embodiments of the invention.

FIG. 5 is an illustrative flow diagram of a segment distribution process in accordance with embodiments of the invention. The segment distribution process may be executed by, for example, the computer system Host A 100 or Host B 130 of FIG. 1. The segment distribution process corresponds to the segment distribution logic 106, 136 of FIG. 1, and to the segment distribution logic 206 of FIG. 2. Block 502 divides the original data into segments, as described above with reference to the segmentation logic 208 of FIG. 2. Block 504 acquires a segment, i.e., processes the next segment in the order that the segments appear in the data. Note that the segments may be processed in any order, as long as some means is employed for later reconstructing the segments in their original order. For simplicity of explanation, this process processes the segments in their original order. Block 506 determines a characteristic of the segment. For example, block 506 may use a hash function, or the length of the segment, or any other method that is repeatable, produces a uniform distribution, and is efficient to compute.

Block 508 generates a repository identifier based upon the characteristic of the data. For example, block 508 may generate the repository identifier as the characteristic of the data modulo the number of repositories in the system. As another example, block 508 may consult a mapping table that maps ranges of characteristic values (e.g., 1-10000) to repositories (e.g. http://host1/repository1 for the range 1-10000). Block 508 is similar to the repository selection logic 222 of FIG. 2. Block 510 creates a segment identifier that contains the characteristic value and a key (e.g., a hash) value that is based on the segment data. Block 512 sends the segment identifier and the segment to the repository identified by the repository identifier. Block 514 adds, e.g., appends, the segment identifier to a de-duplicated representation of the original data. Block 516 repeats the process for each segment in the original data.

Figure 6:
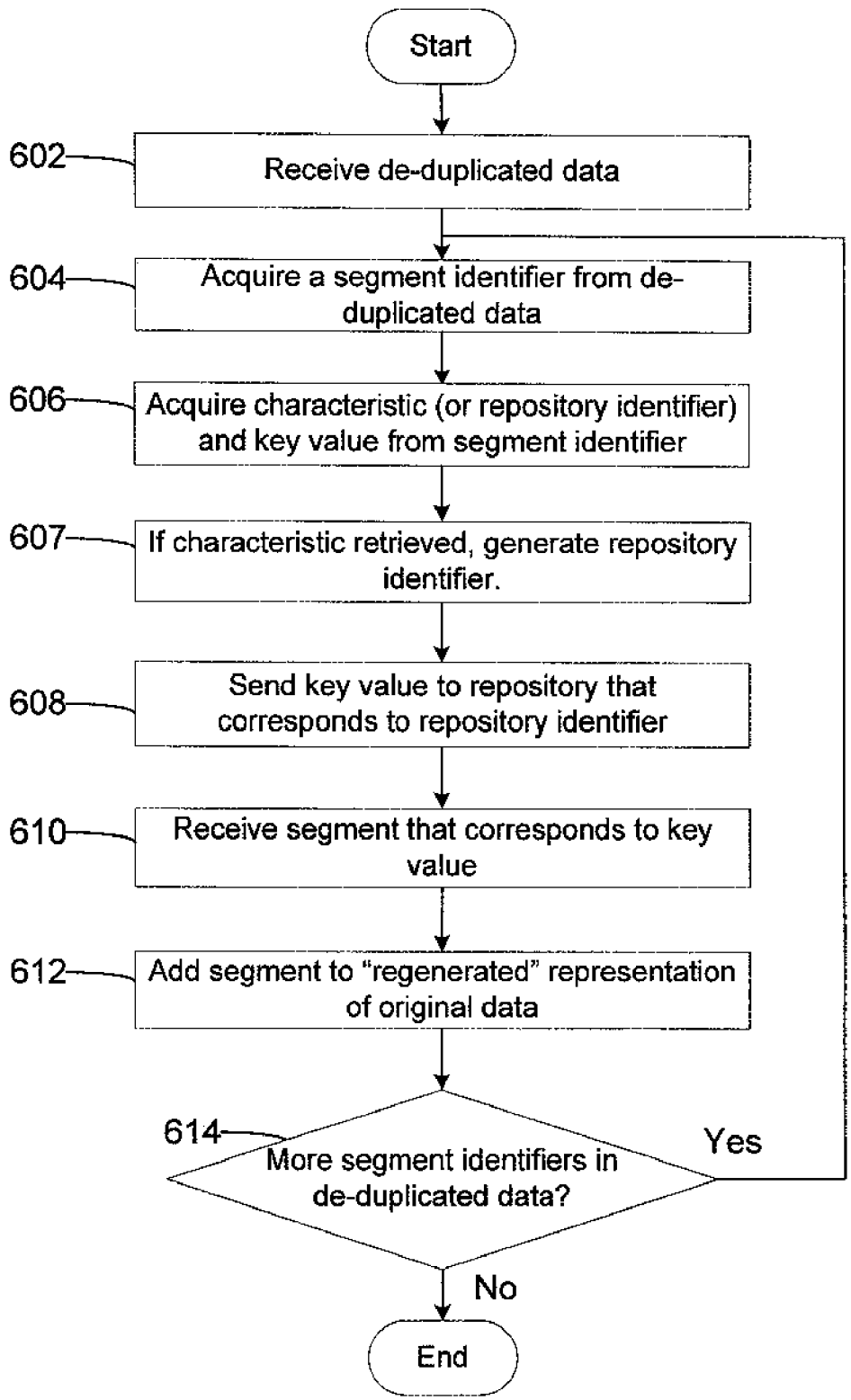
FIG. 6 is an illustrative drawing of a segment reassembly process for retrieving de-duplicated data in accordance with embodiments of the invention.

FIG. 6 is an illustrative drawing of a segment re-assembly process for retrieving de-duplicated data in accordance with embodiments of the invention. The segment reassembly process may be executed by, for example, the computer system Host A 100 or Host B 130 of FIG. 1. The segment re-assembly process corresponds to the segment re-assembly logic 108, 138 of FIG. 1, and to the segment re-assembly logic 314 of FIG. 3. Block 602 receives de-duplicated data, such as data produced by the segment distribution process of FIG. 5. Block 604 acquires a segment identifier from the de-duplicated data, i.e., processes the next segment identifier in the order that the segments appear in the data. Note that the segments may be processed in any order, as long as a method is employed for later reconstructing the segments in their original order. For simplicity of explanation, this process processes the segments in their original order. In one example, the segment identifier includes a previously-generated repository identifier. In that case, there is no need to generate a repository identifier when reading the segment identifiers. In another example, the segment identifier includes a characteristic from which a repository identifier can be generated. In that case, the repository identifier may be generated after the characteristic has been read from the storage medium.

Block 606 acquires, e.g., extracts, the repository identifier or characteristic value and key (e.g., hash) value from the segment identifier. If the characteristic value was retrieved (i.e., the repository identifier is not present on the storage medium), then block 607 generates the repository identifier as described above with respect to block 508 of FIG. 5. If the repository identifier is stored on the storage medium, then block 607 may be omitted. Block 608 sends the key value to a repository that corresponds to the characteristic. Block 608 selects a repository based upon the characteristic. In one example, the characteristic value is a repository identifier, so block 608 simply supplies the characteristic value as a destination repository number and sends a request to the repository identified by that repository number. Block 610 receives a segment from the repository in response to the request sent in block 608. The received segment corresponds to the key value. Block 612 adds, e.g., appends, the received segment to a "regenerated" representation of the original data. Block 614 repeats the process for each segment identifier in the de-duplicated data.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof; as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 7:
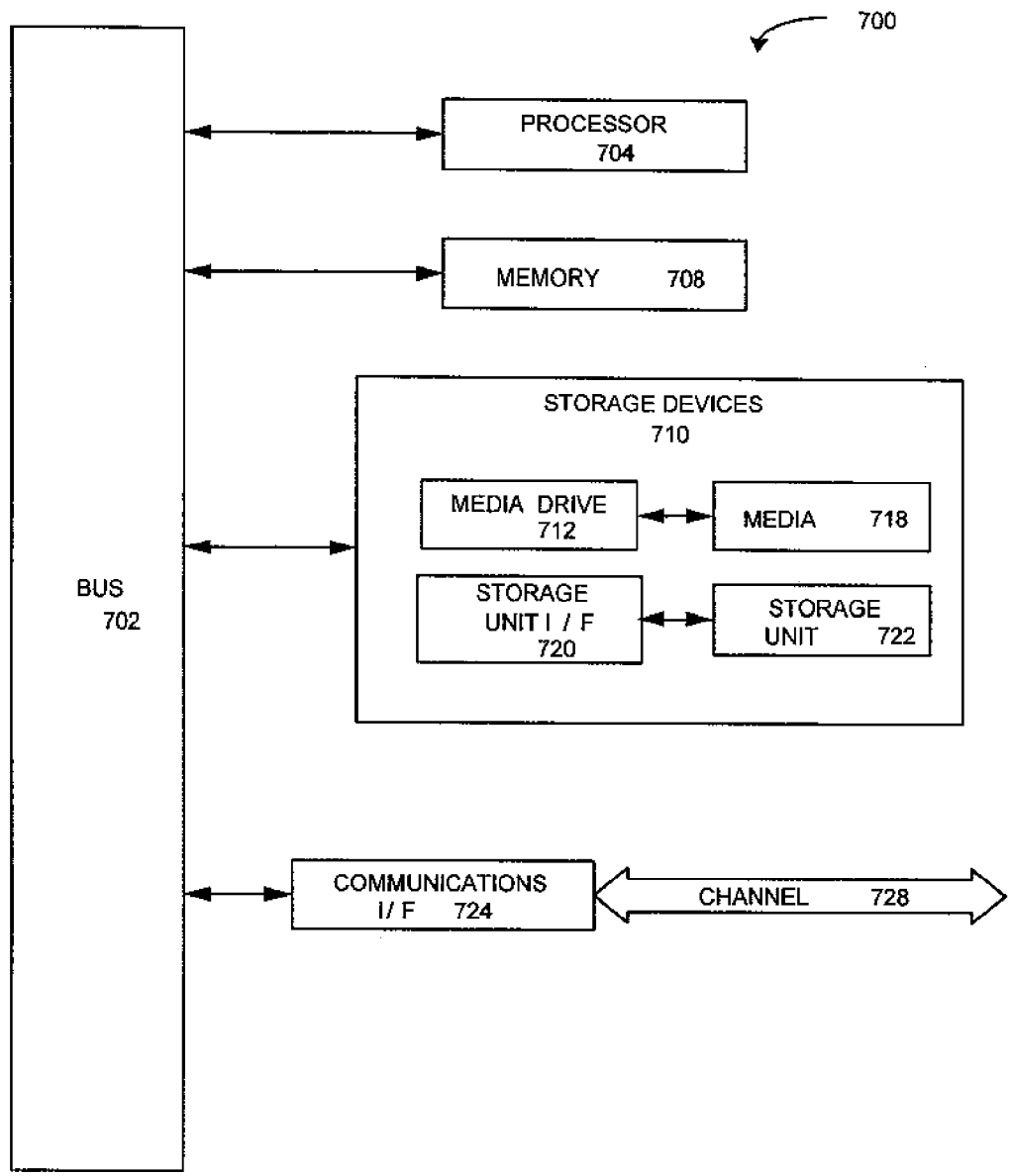
FIG. 7 is an illustrative drawing of an exemplary computer system that may be used in accordance with some embodiments of the invention.

FIG. 7 is an illustrative drawing of an exemplary computer system that may be used in accordance with some embodiments of the invention. FIG. 7 illustrates a typical computing system 700 that may be employed to implement processing functionality in embodiments of the invention. Computing systems of this type may be used in clients and servers, for example. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718, may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 708, storage device 718, or storage unit 722. These and other forms of computer-readable media may be involved in storing one or more instructions for use by processor 704, to cause the processor to perform specified operations. Such instructions, generally referred to as "computer program code" (which may be grouped in the form of computer programs or other groupings), when executed, enable the computing system 700 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. Segment distribution logic for distributing a segment of data across multiple repositories located on multiple apparatuses in a data storage system and for distributing an index associated with the data storage system across the multiple repositories, the logic comprising:
   segmentation logic for dividing data into at least one segment according to a segmentation scheme;
   characteristic generation logic for generating a characteristic based upon the at least one segment, where the characteristic generation logic is operable to repeatedly produce the same characteristic for the same segment, and the characteristic generation logic is further operable to generate a substantially uniform distribution of characteristics for different segments;
   repository selection logic for generating a repository identifier based upon the characteristic;
   communication logic for communicating the segment and a segment identifier that refers to the segment to a repository identified by the repository identifier, the repository being located on a remote computer, and
   output logic for storing on a storage medium the segment and the segment identifier, where the segment identifier comprises the repository identifier and a key based upon the segment of data, where the output logic is operable to generate the key using a hash function, and where the storage medium is configured to store the segment and an index for locating the segment,
   where the characteristic comprises a cryptographic hash value computed from the segment, a simpler hash value based on the segment, or a length of the segment, and
   where the repository selection logic is operable to select the repository identifier, based upon the characteristic, from a mapping table.

2. The logic of claim 1, where the repository identifier is based upon the characteristic modulo a number of repositories.

3. The logic of claim 1 where the repository identifier identifies the repository that will store the segment.

4. Segment re-assembly logic for re-assembling original data from data segments distributed across multiple repositories located on multiple apparatuses, the logic comprising:
   segment identifier retrieval logic for retrieving at least one characteristic from a storage medium, where the at least one characteristic is retrieved from an index located on one of the multiple repositories located on the multiple apparatuses;
   repository selection logic for generating at least one repository identifier based upon the at least one characteristic; and
   communication logic for receiving at least one segment of data from at least one repository identified by the at least one repository identifier, the repository being located on a remote apparatus,
   where the characteristic comprises a cryptographic hash value based upon the at least one segment of data, a simpler hash value based upon the at least one segment of data, or a length of the at least one segment of data, and
   where the repository selection logic is operable to select the repository identifier, based upon the characteristic, from a mapping table.

5. The logic of claim 4, where the repository identifier is based upon the characteristic modulo a number of repositories.

6. The logic of claim 4, where the segment identifier retrieval logic is further operable to retrieve from the storage medium at least one key associated with the at least one repository identifier, and the at least one segment of data is identified in the repository by the at least one key.

7. A computer-enabled method of distributing at least one segment of data across multiple repositories located on multiple apparatuses in a data storage system, the method comprising:
   generating a segment identifier based upon the at least one segment of data, where the segment identifier comprises a key and a repository identifier, and the key and the repository identifier are based upon the at least one segment of data;
   generating a characteristic based upon the at least one segment of data, using a characteristic generation method that is capable of repeatedly producing the same characteristic for the same segment and that is capable of producing a substantially uniform distribution of characteristics for different segments;
   generating the repository identifier based upon the characteristic; and
   communicating via a communication network the segment identifier and the segment of data to a repository identified by the repository identifier, the repository being located on a remote apparatus, the repository being configured to store the segment and an index for locating the segment,
   where the characteristic comprises a cryptographic hash value based upon the at least one segment of data, a simpler hash value based upon the at least one segment of data, or a length of the at least one segment of data, and
   where generating the repository identifier comprises selecting the repository identifier, based upon the characteristic, from a mapping table.

8. The method of claim 7, where the repository identifier is based upon the characteristic modulo a number of repositories.

9. The method of claim 7, comprising:
storing the repository identifier on a storage medium.

10. A computer-enabled method of regenerating at least one segment of data in a data storage system, the method comprising:
retrieving at least one segment identifier from a storage medium, where the at least one segment identifier comprises a hash value and a characteristic;
generating a repository identifier based upon the characteristic;
communicating the identifier to a repository identified by the repository identifier via a communication network, the repository being located on a remote apparatus; and
receiving at least one segment of data from the repository via the communication network, wherein the at least one segment of data corresponds to the hash value,
where the characteristic comprises a cryptographic hash value based upon the at least one segment of data, a simpler hash value based upon the at least one segment of data, or a length of the at least one segment of data, and
where generating the repository identifier comprises selecting the repository identifier, based upon the characteristic, from a mapping table.

11. The method of claim 10, where the repository identifier is based upon the characteristic modulo a number of repositories.

12. A computer system, comprising:
a processor;
a memory;
a set of logics; and
an interface to connect the processor, the memory, and the set of logics, the set of logics comprising:
segment distribution logic configured to distribute different data segments to multiple different repositories located on multiple different apparatuses, the segment distribution logic comprising:
segmentation logic configured to divide data into two or more different data segments according to a segmentation scheme;
characteristic generation logic configured to generate a characteristic for a data segment as a function of the contents of the data segment, the function being repeatable and deterministic, the function being configured to produce a substantially uniform distribution of characteristics for the two or more different data segments;
repository selection logic for generating a repository identifier for a data segment based upon the characteristic of the data segment, where the repository selection logic is configured to produce different repository identifiers for different data segments having different characteristics; and
communication logic configured to communicate a data segment and a characteristic to a repository selected as a function of the repository identifier associated with the data segment, the repository being one of multiple repositories located on multiple apparatuses, the repository being located on a remote apparatus;
segment re-assembly logic configured to reassemble original data from data segments distributed across multiple different repositories located on multiple remote apparatuses, the segment re-assembly logic comprising:
segment identifier retrieval logic configured to retrieve at least one characteristic from a storage medium;
repository selection logic configured to generate a repository identifier for a data segment based upon the characteristic of the data segment, where the repository selection logic is configured to produce different repository identifiers for different data segments having different characteristics; and
communication logic configured to receive a data segment from a repository selected as a function of the repository identifier, the repository being located on a remote apparatus
where the characteristic comprises a cryptographic hash value computed from the segment, a non-cryptographic hash value based on the segment, or a length of the segment, and
where generating the repository identifier comprises selecting the repository identifier, based upon the characteristic, from a mapping table.

13. The system of claim 12, where the repository identifier is based upon the characteristic modulo a number of repositories.

14. The system of claim 12, where the repository identifier identifies the repository that will store the segment.

* * * * *